(12) United States Patent
Lee et al.

(10) Patent No.: US 11,786,063 B2
(45) Date of Patent: Oct. 17, 2023

(54) COMMODITY DEPOSIT DEVICE

(71) Applicant: LG ELECTRONICS INC., Seoul (KR)

(72) Inventors: Seojin Lee, Seoul (KR); Eugene Myung, Seoul (KR); Miyoung Seo, Seoul (KR); Wonjin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 56 days.

(21) Appl. No.: 17/620,009

(22) PCT Filed: May 6, 2020

(86) PCT No.: PCT/KR2020/005927
§ 371 (c)(1),
(2) Date: Dec. 16, 2021

(87) PCT Pub. No.: WO2020/256278
PCT Pub. Date: Dec. 24, 2020

(65) Prior Publication Data
US 2022/0361699 A1    Nov. 17, 2022

(30) Foreign Application Priority Data
Jun. 19, 2020   (KR) .................. 10-2019-0073165

(51) Int. Cl.
A47G 29/30    (2006.01)
A47G 29/14    (2006.01)

(52) U.S. Cl.
CPC .......... *A47G 29/30* (2013.01); *A47G 29/141* (2013.01); *A47G 2029/146* (2013.01)

(58) Field of Classification Search
None
See application file for complete search history.

(56) References Cited

U.S. PATENT DOCUMENTS 10,096,183 B2 * 10/2018 Nitu .................... G07F 9/001
10,424,143 B2 *  9/2019 Miller ............... G07C 9/00912
(Continued)

FOREIGN PATENT DOCUMENTS

CN    105222522 A    1/2016
CN    208832806 U    5/2019
(Continued)

*Primary Examiner* — K. Wong
(74) *Attorney, Agent, or Firm* — Bryan Cave Leighton Paisner LLP

(57) ABSTRACT

A commodity deposit device includes delivery box sets, and a control panel configured to control the plurality of delivery box sets, wherein each of the plurality of delivery box sets includes a plurality of delivery boxes stacked, the control panel includes a controller configured to control opening and closing of the plurality of delivery boxes, and a display configured to output storage status information of the plurality of delivery boxes, and each of the plurality of delivery boxes includes a cabinet with a storeroom defined therein, a door rotatably connected to the cabinet and configured to open and close the storeroom, a commodity information recognizer installed at one side of an inside of the storeroom and configured to recognize an encryption code indicated on a commodity received into the storeroom, and a door lock configured to lock or unlock the door in response to a command transmitted from the controller.

16 Claims, 13 Drawing Sheets

(56) References Cited

U.S. PATENT DOCUMENTS

| | | | |
|---|---|---|---|
| 10,643,415 B2* | 5/2020 | Fee | G06K 7/1417 |
| 10,915,856 B2* | 2/2021 | Fee | G06Q 10/087 |
| 10,997,548 B2* | 5/2021 | Nelson | G07C 9/00817 |
| 11,423,724 B2* | 8/2022 | Gomez Santamaria | |
| | | | G07C 9/00896 |

FOREIGN PATENT DOCUMENTS

| | | | |
|---|---|---|---|
| JP | 2012-070800 A | 4/2012 | |
| JP | 2016094298 A | 5/2016 | |
| JP | 2018-149017 A | 9/2018 | |
| KR | 10-2016-0144052 A | 12/2016 | |
| KR | 10-1836808 B1 | 3/2018 | |
| KR | 10-2018-0092083 A | 8/2018 | |
| KR | 10-2019-0024377 A | 3/2019 | |

* cited by examiner

Select storage box.

| 1 | 9 | | 15 | 23 |
|---|---|---|----|----|
| 2 |   | | 16 | 24 |
| 3 |   | | 17 | 25 |
| 4 | 10| | 18 | 26 |
| 5 | 11| | 19 | 27 |
| 6 | 12| | 20 | 28 |
| 7 | 13| | 21 | 29 |
| 8 | 14| | 22 | 30 |

The door is opened.
Store courier information through reader stored in
storage box #20 and then close the storage box.

COMMODITY DEPOSIT DEVICE

This application is the National Stage filing under 35 U.S.C. 371 of International Application No. PCT/KR2020/005927, filed on May 6, 2020, and claims priority to and the benefits of Korean Application No. 10-2019-0073165, filed on Jun. 19, 2019, all of which are incorporated by reference in their entirety herein.

TECHNICAL FIELD

The present disclosure relates to a commodity deposit device.

BACKGROUND ART

With convergence of online technology and offline business methods, an industrial structure that is only considered as an offline area has evolved more conveniently with online technology.

Recently, a smart delivery box for safely storing commodities ordered through an online shopping mall has been on the market.

The following cited reference discloses content in which, when a courier delivers a commodity, stores the commodity in a designated delivery box, and closes the door, a password is transmitted with a delivery box number to a mobile device of a commodity orderer, that is, a delivery recipient.

However, according to the cited reference (Korean Patent Publication No. 2018-0092083 (Aug. 17, 2018), a courier is inconvenienced by looking at a control panel of a delivery box to find empty delivery boxes one by one and designating a delivery box for each delivery recipient.

In detail, the courier is inconvenienced by designating a delivery box through a control panel screen for each delivery recipient, storing commodities, and then moving back toward the control panel to designate a delivery box of a next recipient on the control panel screen.

The delivery box disclosed in the cited reference has a constant storage space, and thus there is a disadvantage that a courier is not capable of adjusting the size of the storage space depending on the size of a delivered commodity.

DISCLOSURE

Technical Problem

Therefore, the present disclosure has been proposed in view of the above problems.

Technical Solution

To achieve the above objects, a commodity deposit device according to an embodiment of the present disclosure may include a plurality of delivery box sets, and a control panel configured to control the plurality of delivery box sets, wherein each of the plurality of delivery box sets includes a plurality of delivery boxes stacked, the control panel includes a controller configured to control opening and closing of the plurality of delivery boxes, and a display configured to output storage status information of the plurality of delivery boxes, and each of the plurality of delivery boxes includes a cabinet with a storage room defined therein, a door rotatably connected to the cabinet and configured to open and close the storage room, a commodity information recognizer installed at one side of an inside of the storage room and configured to recognize an encryption code indicated on a commodity received into the storage room, and a door lock configured to lock or unlock the door in response to a command transmitted from the controller.

Advantageous Effects

The commodity deposit device according to an embodiment of the present disclosure as configured above may have the following effects.

First, when a courier approaches a commodity deposit device, approach of the courier may be detected through an RFID tag or a BLE communication module of the commodity deposit device, and all doors of currently empty delivery boxes may be opened.

When a courier commodity is received into a delivery box, a commodity information recognizer installed inside a delivery box may scan an encryption code and may transmit courier information including receiver information included in the encryption code information to a courier receiver.

As a result, a courier may not need to select a delivery box for each courier receiver and may just receive a courier commodity in an empty delivery box and close the door, and accordingly, inconvenience caused by an existing delivery receipt procedure may be advantageously overcome.

Second, a password of a delivery box into which a courier commodity is received may be transmitted to only a courier receiver, and thus advantageously, there is no risk of loss of the courier commodity.

Third, a plurality of delivery boxes may be integrated into one storage box depending on the size of a courier commodity to advantageously use the extended storage box.

Fourth, when a rotation shaft of a delivery box door is changed by extending the delivery box, a rotation shaft may be freely selected, and thus, the delivery box may be advantageously and easily extended.

DESCRIPTION OF DRAWINGS

FIGS. 3 and 4 are diagrams showing information displayed on a display of a commodity deposit device according to an embodiment of the present disclosure when a storage command or a find command is input.

BEST MODE

Hereinafter, a commodity deposit device according to an embodiment of the present disclosure will be described in detail with reference to drawings.

Hereinafter, a commodity delivered to a courier may be defined as a courier commodity, a delivery commodity, an ordered commodity, etc.

An entity that delivers commodities may be defined as a delivery company or a courier company.

A person who delivers commodities may be defined as a courier or a delivery man.

A space that stores commodities may be defined as a delivery box or a storage box.

Figure 1:
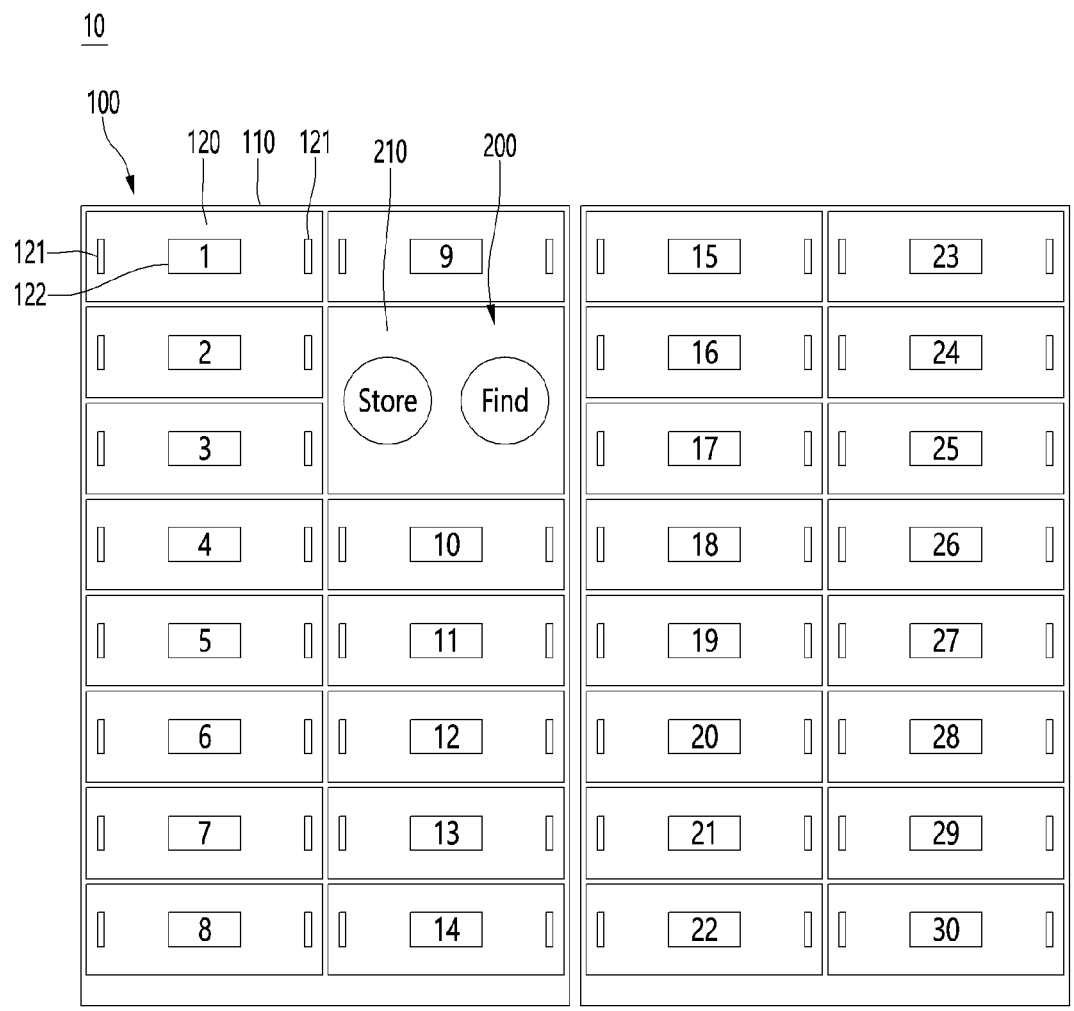
FIG. 1 is a front view of a commodity deposit device according to an embodiment of the present disclosure.
Figure 2:
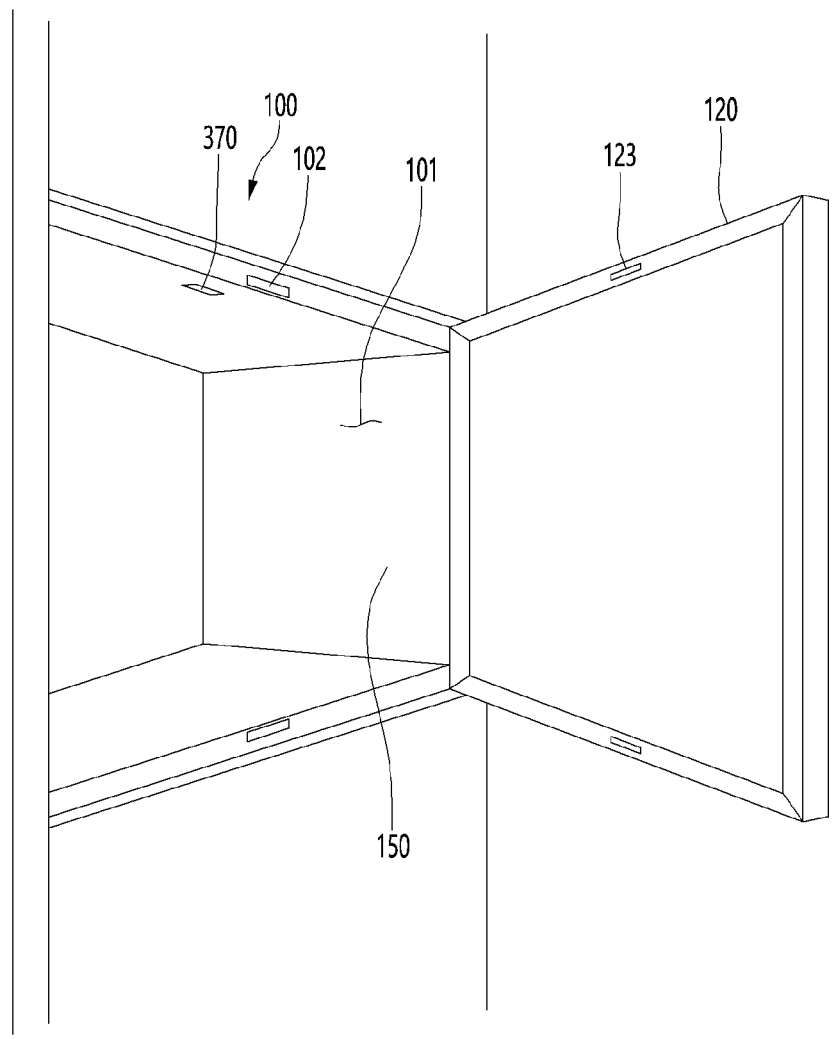
FIG. 2 is a perspective view of a delivery box included in the commodity deposit device.

FIG. 1 is a front view of a commodity deposit device according to an embodiment of the present disclosure. FIG. 2 is a perspective view of a delivery box included in the commodity deposit device.

Referring to FIGS. 1 and 2, a commodity deposit device 10 according to an embodiment of the present disclosure may include a delivery box assembly and a control panel 200 for controlling a plurality of delivery boxes 100.

In detail, the delivery box assembly may include a plurality of delivery box sets that are arranged laterally. Each of the plurality of delivery box sets may be understood as being formed by accumulating the plurality of delivery boxes 100 (or storage boxes).

In other words, it may be understood that one delivery box set is formed by stacking the plurality of delivery boxes and that a delivery box assembly is formed by arranging the plurality of delivery box sets laterally.

In more detail, the commodity deposit device 10 according to the present disclosure may include a cabinet 110 with a plurality of storage rooms 101 defined therein, and a plurality of doors 120 rotatably connected to the cabinet 110 and configured to open and close the plurality of storage rooms 101.

The plurality of storage rooms 101 may be divided by a plurality of partitions 150.

The partition 150 may include a vertical partition for dividing the storage room to left and right sides, and a horizontal partition for dividing the storage room into upper and lower sides.

By the plurality of partitions 150, one delivery box 100 may basically define one storage room 101, and the plurality of delivery boxes may be changed to define one storage room by moving the partitions 150.

A number indication part 122 corresponding to an address of the delivery box 100 may be formed on a front surface of the door 120.

A handle 121 may be formed on one or both sides of left and right edges of the door 120. As necessary, in a structure in which a rotation shaft (or a hinge shaft) of the door 120 is changeable to a right side from a left side or to the left side from the right side, the handle 121 may be formed on each of the both edges of the door 120.

A door latch 123 may be provided on a rear surface of the door 120, and a latch holder 102 for accommodating and fixing the door latch 123 may be provided on a front surface of the cabinet 110. The door 120 may be maintained in a closed state by a coupling of the door latch 123 and the latch holder 102, and the closed state of the door 120 may be released by a decoupling of the door latch 123 from the latch holder 102.

Other devices other than the door latch 123 and the latch holder 102 may also be applied for a locking device of the door 120. For example, an electromagnet and a permanent magnet may be provided in the door 120 and the cabinet 110, respectively, and thus, attractive or repulsive force may be applied between the electromagnet and the permanent magnet depending on a direction of current flow to control a closed or open state of the door 120.

As shown in the drawings, the locking device of the door 120 may also be formed on upper and lower edges of the rear surface of the door 120, but may also be formed on the left and right edges of the rear surface of the door 120.

In a structure in which the position of the hinge shaft of the door 120 is changeable, it is important that the locking device of the door 120 should be formed at a position where a locking function can be performed irrespective of whether the hinge shaft is positioned at the left edge or the right edge.

The control panel 200 for controlling opening and closing of the plurality of delivery boxes 100 may include a display 210. A courier or a commodity orderer (hereinafter defined as a user or a recipient) may select a delivery box through a touchscreen provided to the display 210 and may input various pieces of information including a storage command, a find command, or the like. However, it may not exclude that a separate button for inputting various commands or information is provided.

When a camera is installed in the storage room 101 of the delivery box 100, an image captured by the camera may be output to the display 210 or may be transmitted to a mobile device of the user.

Figure 4:
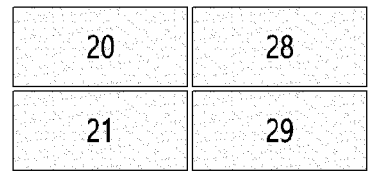

FIGS. 3 and 4 are diagrams showing information displayed on a display of a commodity deposit device according to an embodiment of the present disclosure when a storage command or a find command is input.

First, referring to FIG. 3, in order for the user to find a delivery commodity (defined as a release) or for the courier to store the delivery commodity (defined as a receipt), the user or the courier needs to select a delivery box for release or receipt.

To this end, the user or the courier needs to touch a release command button (or a find button) for release or a receipt command button (or a storage button) for receipt, which is displayed on the display 210.

When a receipt or release command is input by touching the receipt command button or the release command button, the display 210 may display an image showing the commodity deposit device 10. A currently empty delivery box and a delivery box with a commodity stored therein may be displayed with different colors on a screen of the commodity deposit device 10.

In this state, the user may touch a number of a delivery box storing a commodity that user is looking for and the courier may touch a number of one or more delivery boxes depending on the size of a delivery commodity to be stored.

When the size of the delivery commodity is larger than the size of the storage room 101 of a single delivery box 100, the courier may select a plurality of delivery boxes by dragging the display 210 with a finger as shown in FIG. 3.

When the courier selects the plurality of delivery boxes adjacent to each other at once through dragging, doors of the plurality of selected delivery boxes may be opened.

Referring to FIG. 4, when the courier selects the plurality of delivery boxes, the plurality of selected delivery boxes may be displayed, and a message indicating opening of a door and a message indicating master delivery box information may be displayed on the display 210.

That is, when any one of the plurality of delivery boxes is automatically determined as a master delivery box, a text or a voice message instructing that an encryption code indicated on a received commodity be scanned may be output through a commodity information recognizer provided to the determined master delivery box.

When the plurality of delivery boxes are selected at once, a plurality of storage rooms needs to be integrated into one storage room by changing the position of the partition 150 for dividing the plurality of delivery boxes.

Here, when a plurality of delivery boxes adjacent in upper and lower directions or left and right directions are selected, an image asking whether to integrate the storage rooms into one storage room by moving the partitions for dividing the plurality of selected delivery boxes may be displayed on the display 210. Then, when the courier checks the size of the delivery commodity and touches a check button for determining whether to integrate storage rooms of delivery boxes into one storage room, the partitions may be moved or rotated to integrate the plurality of adjacent delivery boxes into one storage room.

Hereinafter, the structure of partitions for integrating a plurality of adjacent storage rooms into one storage room will be described.

Figure 5:
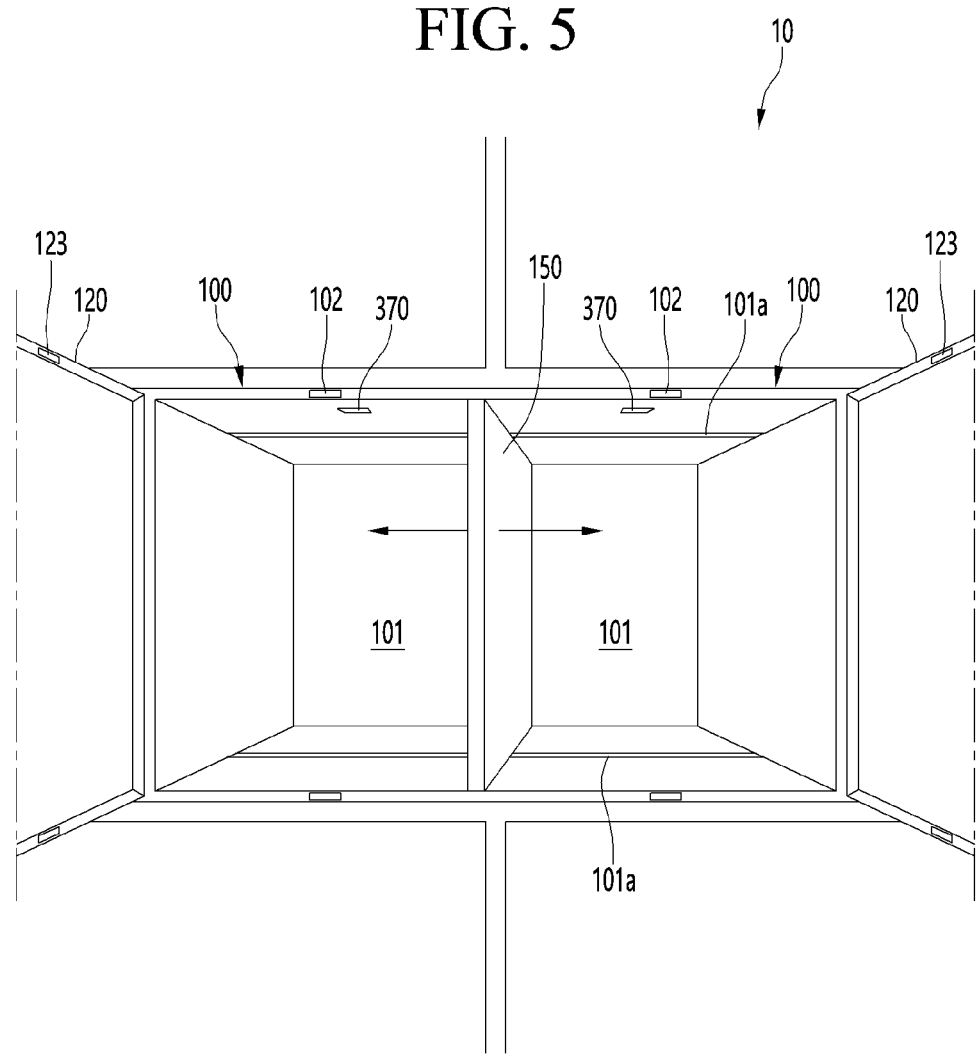
FIG. 5 is a perspective view showing an internal structure of delivery boxes with a plurality of storage rooms to be integrated into one storage room.
Figure 6:
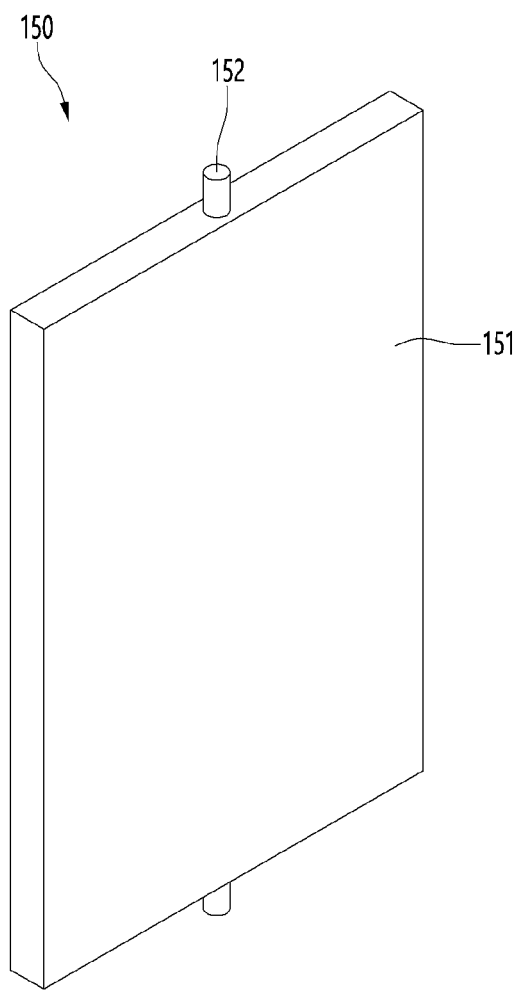
FIG. 6 is a perspective view of a partition to be moved in a storage room.

FIG. 5 is a perspective view showing an internal structure of delivery boxes with a plurality of storage rooms to be integrated into one storage room, and FIG. 6 is a perspective view of a partition to be moved in a storage room.

Referring to FIGS. 5 and 6, as a method of integrating the plurality of storage rooms 101 adjacent in left and right directions into one storage room, a method of slidably moving a partition for dividing adjacent storage rooms may be proposed. This may be applied in the same way to the case in which storage room adjacent in upper and lower directions are integrated into one storage room.

In detail, the partition 150 may include a body part 151 shaped like a plate, and protrusions 152 extending on upper and lower surfaces of the body part 151.

Guide grooves 101a into which the protrusions 152 are inserted may extend in a horizontal direction on upper and lower surfaces of the storage room 101.

According this structure, the protrusions 152 of the partition 150 may be moved to a left or right side of the storage room 101 along the guide grooves 101a to integrate two storage rooms into one storage room.

Therewith, during a procedure of integrating storage rooms of delivery boxes, a hinge shaft of the door 120 may be automatically changed, and the configuration of a partition operation and change in the hinge shaft of the door 120 will be described below with reference to the drawings.

A device for tightly fixing the partition 150 to a left or right inner circumferential surface of the storage room 101 may be further provided. For example, a magnet with attractive force may be installed on a side surface of a storage room and a side surface of the partition 150.

Figure 7:
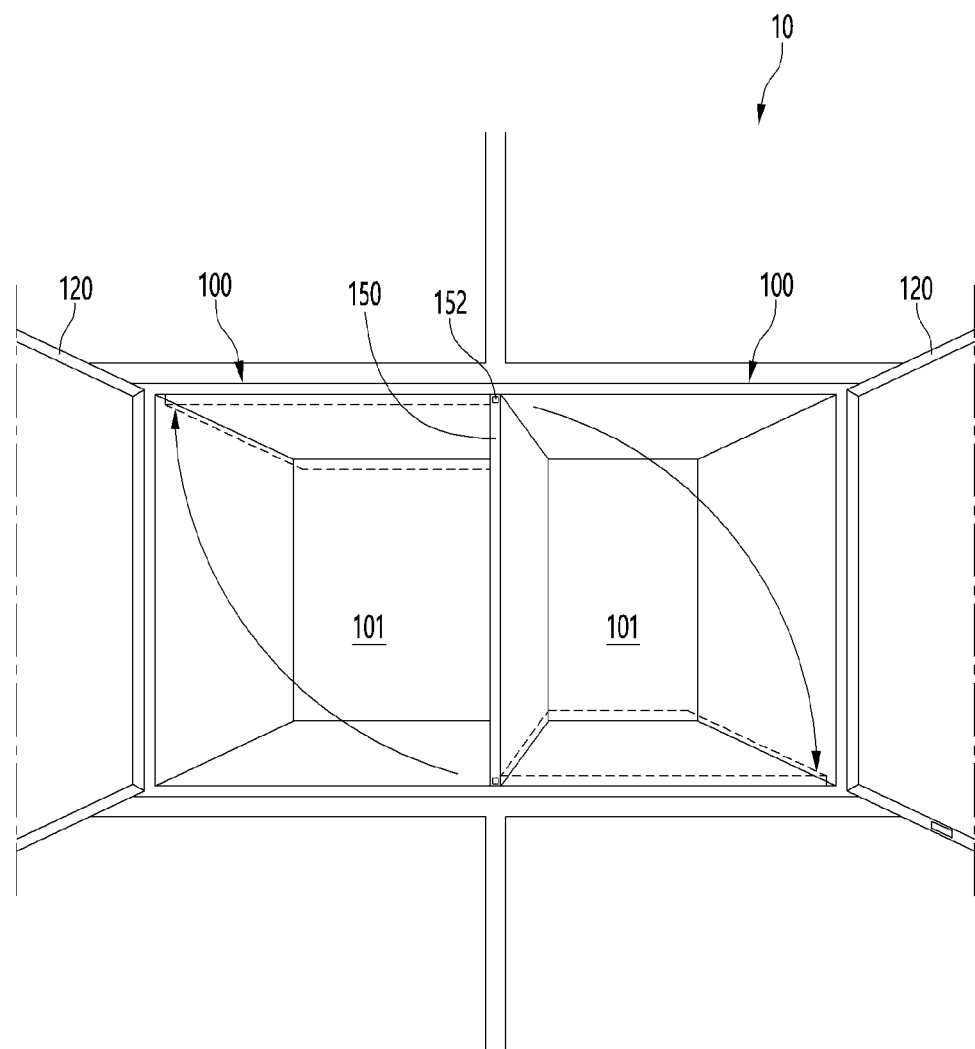
FIG. 7 is a perspective view showing a storage room integration structure according to another embodiment.

FIG. 7 is a perspective view showing a storage room integration structure according to another embodiment.

Referring to FIG. 7, in order to integrate two storage rooms 101 into one storage room, one end of the partition 150 may be rotatably connected to the cabinet 110.

As shown in the drawing, the partition 150 may be fixed to a ceiling of a storage room by being rotated upward or may be fixed to a bottom of the storage room by being rotated downward.

When the partition 150 is fixed to the ceiling of a storage room by being rotated upward, a restraint member for preventing the partition 150 from falling needs to be installed on the ceiling of the storage room 101.

When a plurality of storage rooms is integrated into one storage room, there may be a situation in which a rotation shaft of the door 120 needs to be changed.

As shown in FIGS. 5 and 7, when two storage rooms arranged left and right are integrated into one storage room, a hinge shaft of the right door 120 may be maintained on a right edge as an original position, but a hinge shaft of the left door 120 needs to be changed to a left edge from the right edge.

In order to satisfy the needs, a hinge structure of the door 120 is necessary to be changed.

Figure 8:
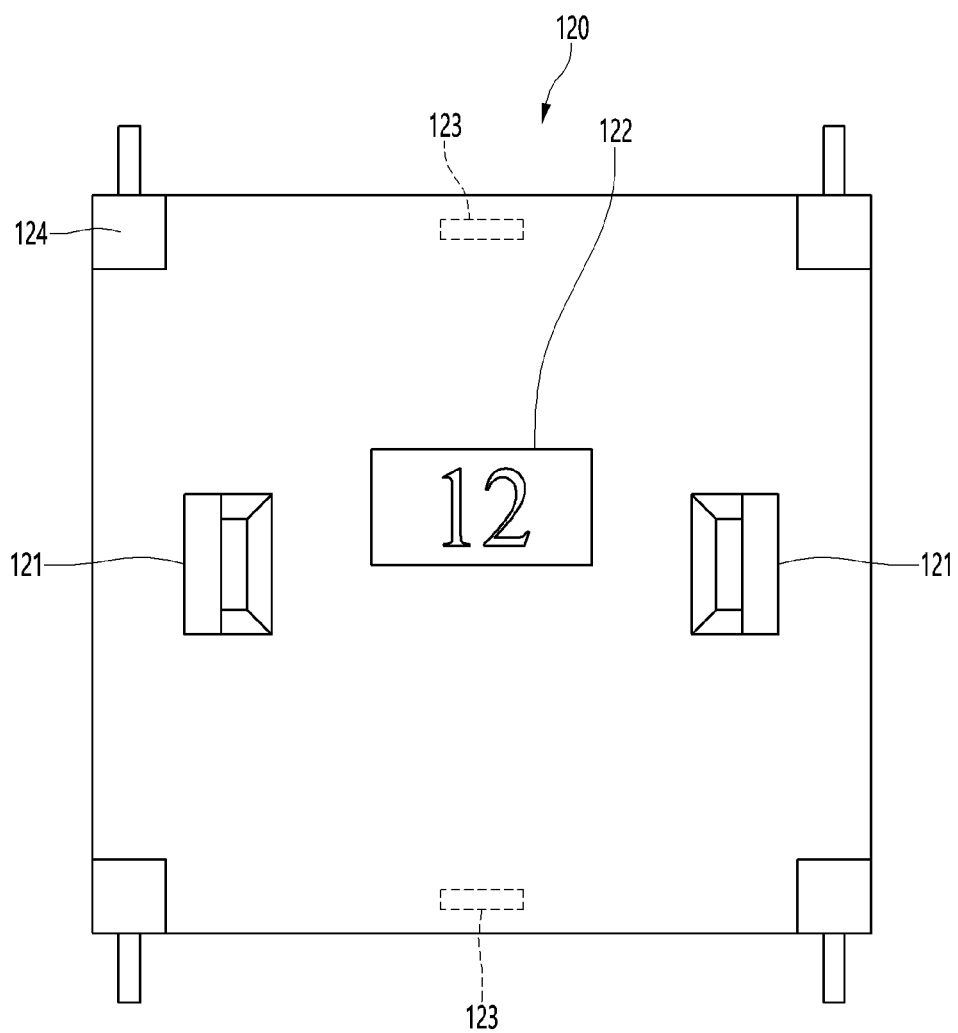
FIG. 8 is a diagram showing a door with a moveable hinge shaft in a situation in which storage rooms are integrated.

FIG. 8 is a diagram showing a door with a moveable hinge shaft in a situation in which storage rooms are integrated.

Referring to FIG. 8, in order to change the position of the hinge shaft during a procedure of integrating storage rooms, solenoid hinges 124 may be installed at four corners of the door 120.

In detail, the solenoid hinges 124 may be understood as a hinge in which a plunger of a solenoid functions as a hinge shaft of the door 120.

The basic configuration of the solenoid is that a plunger protrudes from a solenoid body or is drawn into the solenoid body when current is applied thereto. Thus, the plunger may function as the hinge shaft of the door 120, and thus reverse current may be applied to the solenoid hinge 124 of a corner at which a hinge shaft needs to be removed to allow the plunger to be drawn into the solenoid body.

For example, when the hinge shaft of the door 120 needs to be changed from right to left, forward current may be applied to one pair of solenoid hinges 124 installed at the left edge to allow the plunger to protrude and to be inserted into an upper partition and a lower partition, and reverse current may be applied to one pair of solenoid hinges 124 installed at the right edge to allow the plunger to be drawn into the solenoid body.

The solenoid hinges 124 may be proposed as a method in which an operation of selecting a plurality of delivery boxes and changing a hinge shaft to integrate a plurality of storage rooms into one storage room is performed by a controller of the commodity deposit device 10, and thus it does not exclude application of other types of hinge shafts.

In detail, in order to integrate a plurality of storage rooms into one storage room, a first operation of moving a partition and a second of changing a hinge shaft of a door need to be performed, and in this case, the first and second operations may be automatically performed by the controller of the commodity deposit device 10.

For example, a driving motor structure for straightly moving and rotating the partition 150 may be applied to automatically perform the first operation.

Figure 9:
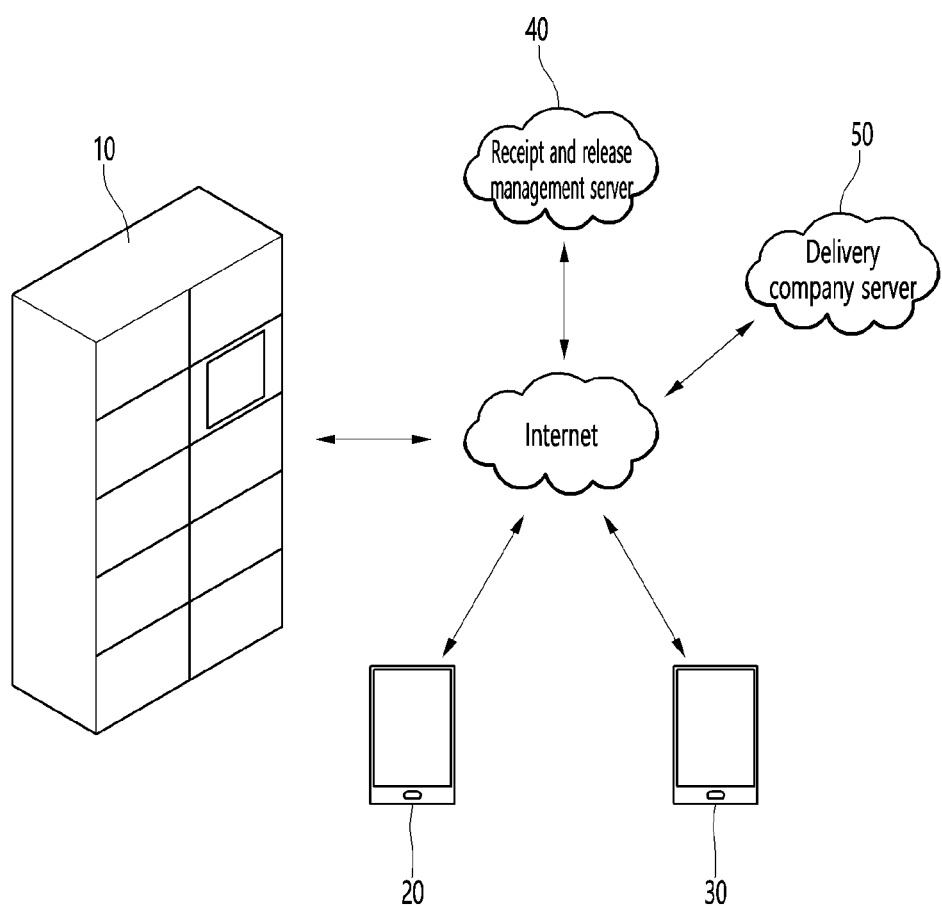
FIG. 9 is a system diagram showing a courier commodity delivery system using a commodity deposit device according to an embodiment of the present disclosure.

FIG. 9 is a system diagram showing a courier commodity delivery system using a commodity deposit device according to an embodiment of the present disclosure.

Referring to FIG. 9, the courier commodity delivery system using the commodity deposit device according to an embodiment of the present disclosure may include the commodity deposit device 10 into and from which an ordered commodity is received and released, a user terminal 20 used to order a commodity, a courier terminal 30 of a courier who delivers the ordered commodity to the commodity deposit device 10, a receipt and release management server 40 for managing receipt and release of the commodity deposit device 10, and a delivery company server 50.

In detail, the commodity deposit device 10, the user terminal 20, and the courier terminal 30 may be connected to the Internet through a wireless communication module, and the commodity deposit device 10 may be connected to the receipt and release management server 40 via the Internet. Thus, information related to a courier commodity, input through the commodity deposit device 10, may be transmitted to and stored in the receipt and release management server 40.

Information transmitted from the receipt and release management server 40 may be transmitted to the user terminal 20 and/or the delivery company server 50 via the internet, and information transmitted to the delivery company server 50 (or a courier company server) may be transmitted to and stored in the courier terminal 30.

The user may access and log in to an application installed in the user terminal 20 to remotely set an open or storage condition (refrigeration, freezing, hot storage, etc.) of the door of the commodity deposit device 10.

A camera installed in the storage room 101 may be remotely manipulated to photograph an internal state of the storage room, and a captured image may be uploaded to the receipt and release management server via the Internet. The image updated to the receipt and release management server may be downloaded to the user terminal 20 via the Internet.

Here, the receipt and release management server may be understood as an application server for managing the application. Thus, various commands and information input through the application installed in the user terminal 2 may be uploaded to the receipt and release management server (or an application server) and may then be stored in a memory (which is described below) of the commodity deposit device 10.

In contrast, information input the control panel 200 of the commodity deposit device 10 may be transmitted to the user terminal 20 through the receipt and release management server 40.

For example, when a courier stores a delivery commodity in the storage room 101 of the delivery box 100, a commodity information recognizer 370 may scan an encryption code printed on a packing box of the delivery commodity. Information acquired by scanning the encryption code may be transmitted with courier contact and password information to the receipt and release management server 40.

The information may be transmitted to the user terminal 20 and may be lastly transmitted to an application installed in the user terminal 20.

Figure 10:
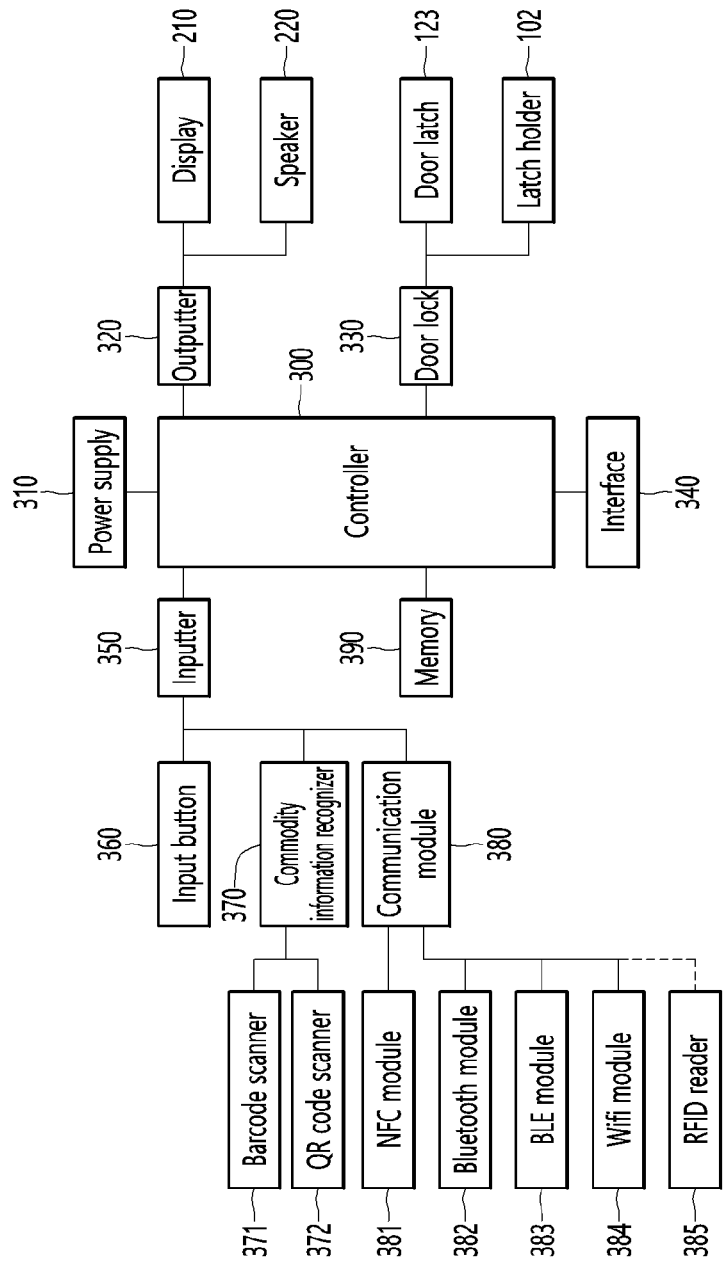
FIG. 10 is a block diagram showing a control configuration of a commodity deposit device according to the present disclosure.

FIG. 10 is a block diagram showing a control configuration of a commodity deposit device according to the present disclosure.

Referring to FIG. 10, the commodity deposit device 10 according to an embodiment of the present disclosure may include a controller (e.g., microprocessor) 300, a power supply 310, an inputter (input part) 350, a door lock 330, an interface 340, an outputter (output part) 320, and a memory 390.

The interface 340 may include various connection ports including a port connected to a storage medium such as a USB or SD card.

The inputter 350 may include an input button 360 for inputting a command, the commodity information recognizer 370 for scanning the encryption code and transmitting the same to the controller 300, and a communication module 380 for enabling near distance wireless communication and Internet access.

The input button 360 may be understood as including a touch button provided on a touchscreen output to the display 210 as well as a mechanical button manipulated by being directly pressed by the user's hand.

The commodity information recognizer 370 may include at least one of a barcode scanner 371 for acquiring information embedded in a barcode by scanning the barcode, or a QR code scanner for acquiring information by scanning a QR code. A component having a function of acquiring information by scanning the encryption code may be used as the commodity information recognizer 370 according to the present disclosure.

The communication module 380 may include at least one of an NFC module 381, a Bluetooth module 382, a BLE module 383, a WiFi module 384, or an RFid reader 385.

The WiFi module 384 may be used to allow the commodity deposit device 10 to access the Internet and to be connected to the receipt and release management server 40.

The RFid reader 385 may be used to recognize an RFid tag carried by the courier when the courier approaches within a set distance from the commodity deposit device 10. The RFid tag carried by the courier may store a courier company name, a courier name, a courier contact, and the like.

Thus, when the courier stores a delivery commodity, courier information and password information required to open the door 120 of the corresponding delivery box 100 with commodity related information acquired through the commodity information recognizer may be transmitted to the receipt and release management server. When accessing the application installed in the user terminal 20, the user may check a password for opening a door and a courier contact with information on a commodity ordered by the user.

Here, a password to be used to open the door 120 of the delivery box 100 may be generated when the encryption code printed on the courier commodity, or may be generated by the receipt and release management server and may also be transmitted to the user terminal 20 when a delivery commodity arrival message is transmitted.

An important point is not a time when the password is generated, but the password may be only generated when a commodity storage operation is completed without being generated by a courier, and accordingly, only the user may be capable of opening the door 120 of the delivery box 100. Then, while a commodity is stored, a person without authority to release a delivery commodity is not capable of opening the door 120, and thus security may be advantageously achieved.

In addition, a near distance wireless communication module including the NFC module 381, the Bluetooth module 382, and the BLE module 383 may be used when the commodity deposit device 10 communicates with a wireless terminal without the Internet.

For example, in the state in which the user terminal 20 and the near distance wireless communication module of the commodity deposit device 10 are paired with each other, the door 120 of the commodity deposit device 10 may be directly opened using the user terminal 20, or various pieces of information may be directly transmitted and received without the Internet.

The outputter 320 may include the display 210 and a speaker 220 for outputting voice, which are included in the control panel 200.

The display 210 may be understood as functioning not only as an inputter due to provision of a touchscreen but also as an outputter due to display of various pieces of information.

The door lock 330 may include the aforementioned door latch 123 and the latch holder 102.

Figure 11:
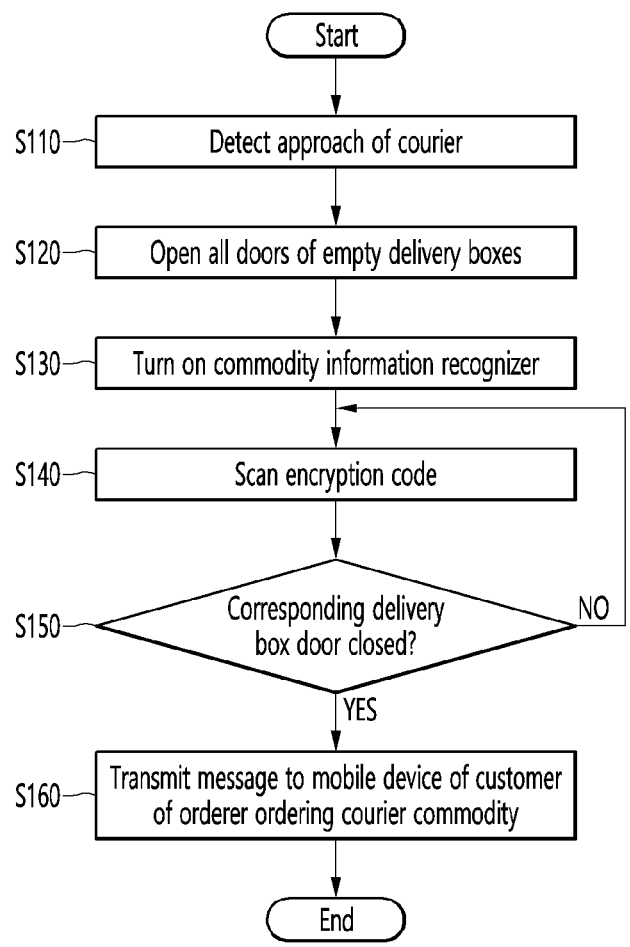
FIG. 11 is a flowchart showing a courier commodity delivery method performed by a commodity deposit device according to an embodiment of the present disclosure.

FIG. 11 is a flowchart showing a courier commodity delivery method performed by a commodity deposit device according to an embodiment of the present disclosure.

Referring to FIG. 11, when a courier carried by an RFid tag approaches the vicinity of the commodity deposit device 10, the RFid reader 385 of the commodity deposit device 10 may recognize the RFid tag of the courier and may receive transmitter information (or deliverer information) including a courier company and a name and contact of the courier. The received transmitter information may be transmitted to the controller 300 and may be stored in the memory 390.

Therewith, the controller 300 may call information on a delivery box that does not currently store a commodity and is available to use and may control the door lock 330 to open all doors of currently empty delivery boxes (S120). Through the operation, the courier may have an advantage of not having to search for numbers of empty delivery boxes one by one in front of the display 210.

The door 120 of the empty delivery box 100 may be opened, and simultaneously, the commodity information recognizer installed in the storage room 101 may be turned on (S130).

In this state, when the courier inputs a delivery commodity inside the storage room 101, the commodity information recognizer 370 may scan an encryption code (a barcode or a QR code) printed on a surface of a packaging material of the delivery commodity (S140) to acquire commodity information and may then transmit the commodity information to the controller 300.

The commodity information may include orderer information including a name and contact of a commodity orderer, commodity information including a type and name of the commodity, and shopping mall site information. Delivery company information may also be embedded in the encryption code.

The courier information (a name and a contact) recognized by the RFid reader may be transmitted with the commodity information to the controller 300. Then, the controller 300 may generate a password used to open the door of the delivery box.

When the courier completes commodity receipt and then closes the door 120 of the corresponding delivery box, the door lock 330 may be operated to close a delivery box door (S150).

When the delivery box door is closed, a delivery box number, orderer information, commodity information, information on a courier who delivers a corresponding commodity, and a password may be transmitted to the receipt and release management server 40. The receipt and release management server 40 may transmit the received information to the user terminal 20 of an orderer who orders a corresponding commodity (S160).

Here, it may be noted that the password is capable of being generated in the receipt and release management server 40 rather than the controller 300.

Figure 12:
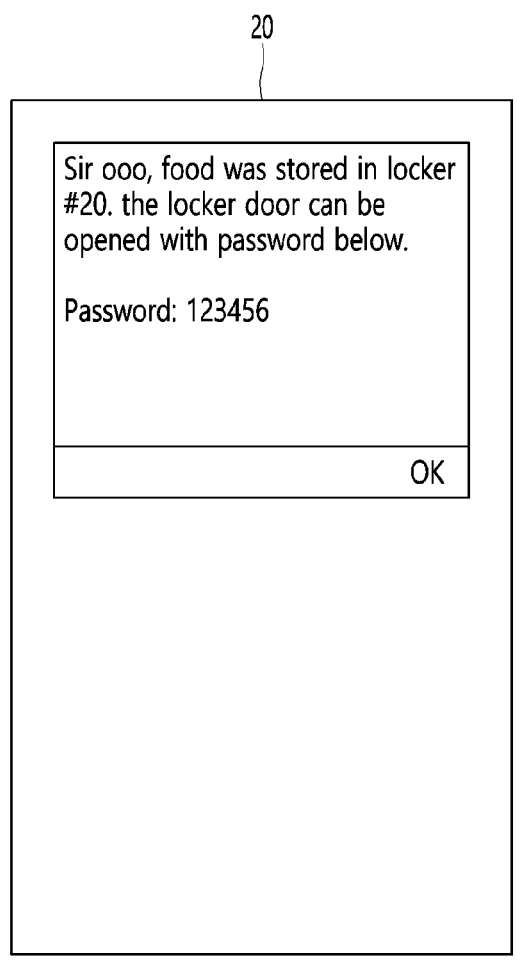
FIG. 12 is a diagram showing a courier commodity delivery notification message displayed on a user terminal.

FIG. 12 is a diagram showing a courier commodity delivery notification message displayed on a user terminal.

Referring to FIG. 12, the delivery notification message transmitted to the user terminal 20 may include at least a name of a commodity orderer, a number of a delivery box that stores a commodity, and a password for opening a door.

After checking the message, the user may open a door of a corresponding delivery box and may release a delivered commodity.

Figure 13:
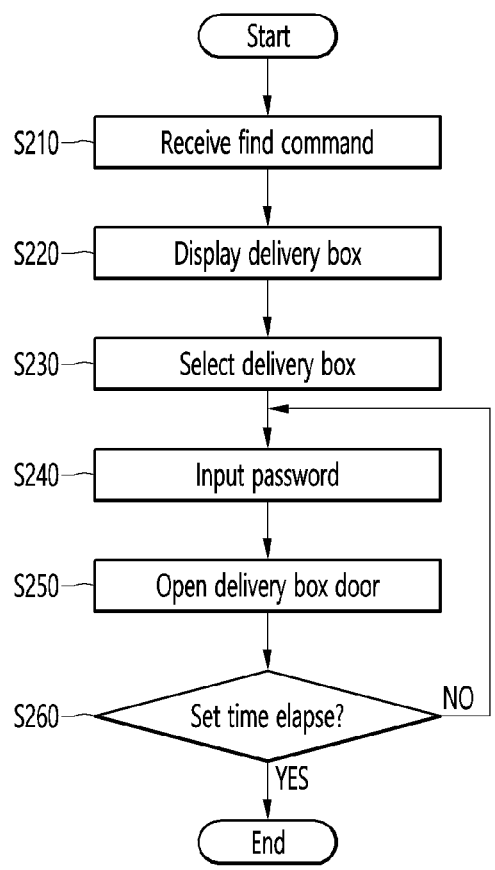
FIG. 13 is a flowchart showing a procedure of releasing a delivery commodity by an orderer who checks a delivery notification message.

FIG. 13 is a flowchart showing a procedure of releasing a delivery commodity by an orderer who checks a delivery notification message.

Referring to FIG. 13, an orderer (or a user) who receives the delivery notification message may move to the control panel 200 of the commodity deposit device 10 and may touch a find button displayed on the display 210 to input a release command.

Then, the controller 300 may receive the release command (S210) and may output a delivery box image (refer to FIG. 2) to the display 210 (S220).

When the user touches a delivery box with a number of the corresponding delivery box on the display 210, the corresponding delivery box may be selected (S230).

Then, the controller 300 may output a password input request image to the display 210 and may receive a password from the user (S240).

When comparing the received password with a door open password of the corresponding delivery box, stored in a memory, and determining that the passwords match each other, the controller 300 may control the door lock to open the door 120 of the delivery box (S250).

When determining that a sufficient time for the user to release a commodity stored in the storage room 101 elapses (S260), the controller 300 may terminate a procedure of releasing the delivery commodity.

The invention claimed is:

1. A commodity deposit device comprising:
a plurality of delivery boxes; and
a control panel to control the plurality of delivery boxes, wherein the control panel includes:
a controller configured to control opening and closing of the plurality of delivery boxes; and
a display to display information regarding the plurality of delivery boxes, and
wherein a delivery box among the plurality of delivery boxes includes:
a cabinet with a storage room defined therein;
a door rotatably connected to the cabinet to open and close the storage room;
a commodity information recognizer installed at an inside of the storage room to recognize a code on a commodity received into the storage room; and
a door lock to lock or unlock the door in response to a signal transmitted from the controller,
wherein laterally adjacent two cabinets have a vertical partition which is movable in order to change two storage rooms into a single storage room,
wherein the vertical partition is configured to laterally slide towards a side surface of the single storage room or is configured to rotate with respect to a horizontal shaft defined at an upper end or lower end of the vertical partition,
and wherein the controller is configured to move the vertical partition.

2. The commodity deposit device of claim 1, wherein the controller is configured to cause the display to display a receipt button and a release button, and
when the controller receives a receipt command based on a touch of the receipt button, the controller is configured to cause the display to display one or more images indicating empty delivery boxes among the plurality of delivery boxes that are available for use.

3. The commodity deposit device of claim 1, wherein, the controller is configured to cause the display to display one or more empty delivery boxes among the plurality of delivery boxes, and when the controller receives input corresponding to one or more selections among the empty delivery boxes, the controller is configured to cause the display to display the one or more empty delivery boxes, which are selected.

4. The commodity deposit device of claim 3, wherein the controller is configured to unlock one or more door locks of one or more doors of the one or more delivery boxes, which are selected.

5. The commodity deposit device of claim 4, wherein, when a commodity is received into the one or more empty delivery boxes, which are selected, the controller is configured to receive commodity information from the commodity information recognizer acquired by recognizing the code on the received commodity.

6. The commodity deposit device of claim 5, wherein the controller is configured to transmit the commodity information to a mobile device of a commodity recipient through a wireless communicator.

7. The commodity deposit device of claim 3, wherein the controller is configured to cause the display to display inquiring whether to integrate storage rooms of the selected plurality of delivery boxes into one storage room when the selected plurality of delivery boxes are adjacent to each other.

8. The commodity deposit device of claim 7, wherein, the controller is configured to move or rotate one or more partitions that divide the plurality of selected delivery boxes from each other and change positions of hinge shafts of one or more doors of some of the selected delivery boxes to change opening and closing side of the one or more doors, when a command for integrating the plurality of adjacent storage rooms into one storage room is received by the controller.

9. The commodity deposit device of claim 1, further comprising:
a detector to detect an approach of a courier,
wherein, when the detector detects the approach of the courier, the controller is configured to release a lock state of door locks of doors of empty delivery boxes among the plurality of delivery boxes.

10. The commodity deposit device of claim 9, wherein, a commodity information recognizer installed in a storage room of a delivery box into which a commodity is received acquires commodity information on the received commodity, and
wherein, the controller is configured to transmit the commodity information to a mobile device of a commodity recipient, when a door of the delivery box, into which the commodity is received, is closed.

11. The commodity deposit device of claim 6, wherein the commodity information includes name and contact information of the commodity recipient.

12. The commodity deposit device of claim 11, wherein the commodity information further includes at least one of a name or a type of the commodity, information on a shopping mall in which the commodity is purchased, a date of purchase of the commodity, or information on a courier company or a courier that delivered the commodity.

13. The commodity deposit device of claim 11, wherein the controller is configured to transmit a password for opening the door of the delivery box, into which the commodity is received, with the commodity information to the mobile device of the commodity recipient.

14. The commodity deposit device of claim 13, wherein the controller is configured to generate the password.

15. The commodity deposit device of claim 1, wherein the door includes a plurality of hinges having a shaft that is retractable into the hinge.

16. The commodity deposit device of claim 15, wherein the controller is configured to control an opening side of the door by protruding some of the shafts of the plurality of hinges and retracting some of shafts of the plurality of hinges to correspond to the opening side of the door.

* * * * *